US008688771B2

(12) United States Patent
East et al.

(10) Patent No.: US 8,688,771 B2
(45) Date of Patent: Apr. 1, 2014

(54) METHOD OF PROVIDING CONTENT TO A MOBILE WEB BROWSING DEVICE

(75) Inventors: Simon Jeremy East, London (GB); Stephen Timothy Spence, Kingston Upon Thames (GB); Thomas Ralph Edwards Greenwell, Abbots Langley (GB); Mark Colin Stalker, Cambridge (GB)

(73) Assignee: Critical Path Data Centre Limited, Chesire (GB)

( * ) Notice: Subject to any disclaimer, the term of this patent is extended or adjusted under 35 U.S.C. 154(b) by 1253 days.

(21) Appl. No.: 10/572,174

(22) PCT Filed: Sep. 16, 2004

(86) PCT No.: PCT/GB2004/003945
§ 371 (c)(1),
(2), (4) Date: Mar. 16, 2006

(87) PCT Pub. No.: WO2005/026985
PCT Pub. Date: Mar. 24, 2005

(65) Prior Publication Data
US 2007/0078964 A1      Apr. 5, 2007

(30) Foreign Application Priority Data

Sep. 16, 2003   (GB) .................................. 0321674.4

(51) Int. Cl.
*G06F 15/16*   (2006.01)

(52) U.S. Cl.
USPC ............................ 709/203; 709/213; 709/223

(58) Field of Classification Search
USPC .......................................... 709/203, 217–219
See application file for complete search history.

(56) References Cited

U.S. PATENT DOCUMENTS

| 6,029,175 | A  | * | 2/2000 | Chow et al. ................. 707/104.1 |
| 6,314,451 | B1 | * | 11/2001 | Landsman et al. ............ 709/203 |
| 6,976,093 | B2 | * | 12/2005 | Lara et al. ...................... 709/248 |
| 2003/0088580 | A1 |  | 5/2003 | Desai et al. ................. 707/104.1 |
| 2004/0077340 | A1 | * | 4/2004 | Forsyth ...................... 455/414.1 |
| 2004/0078292 | A1 | * | 4/2004 | Blumenau ....................... 705/27 |

FOREIGN PATENT DOCUMENTS

WO       WO 03/003688 A2       1/2003

* cited by examiner

*Primary Examiner* — Hua Fan
(74) *Attorney, Agent, or Firm* — Saul Ewing LLP

(57) ABSTRACT

Content is automatically provided to a mobile web browsing device from a web server, by the following process: (a) receiving at a computer, remotely connected to the device, a log of data identifying content that has been viewed by the device; (b) automatically sending updated content stored on the web server to the device; (c) causing that updated content to be automatically stored in device memory. Because user activity is replicated back from the device to the remote computer, the content cached on a given device can be completely optimised for the user of that device and no-one else.

15 Claims, 2 Drawing Sheets

METHOD OF PROVIDING CONTENT TO A MOBILE WEB BROWSING DEVICE

CROSS REFERENCE TO RELATED APPLICATIONS

This application claims the priority of PCT/GB2004/003945 filed on Sep. 16, 2004 and GB 0321674.4 filed on Sep. 16, 2003, the entire contents of which are hereby incorporated in total by reference.

FIELD OF THE INVENTION

This invention relates to a method of providing content to a mobile web browsing device. A web browsing device is a device that can access content on remote computers, the data typically being stored in a mark up language format such as HTML, WML etc. WAP/web pages are examples of content, but other kinds of content are also included.

DESCRIPTION OF THE PRIOR ART

Mobile web browsing devices are well known: the most common device type is a WAP/web enabled mobile cellular telephone.

WAP/web pages, or 'content', is held on a WAP/web server. Content that has been recently viewed on a device may be automatically cached in local device memory using the standard cache management approach within the HTTP/1.1 protocol (defined in RFC 2616). Hence, when a device is out of cellular network coverage, any WAP/web pages stored in the device cache memory will still be viewable on the device. However, most devices have limited memory, so that perhaps only the last 10-20 WAP pages can be automatically stored on the device. With current technology, content can also be cached on a phone for a given period of time. This time is set by the content creator—when it expires the browser is forced to reload the page from the WAP or internet site.

In order to improve the user experience, it is desirable to send and cache pre-defined content "pre-emptively" on subscribers' phones—i.e. to send pre-defined content automatically to a device without an explicit user request for that content. This removes the need for the browser to download WAP pages from the Internet, because they are already cached locally on the phone.

One technology for this is Dynamic Service Delivery from Cognima Limited. This technology however provides no feedback about what content a given user is looking at on the phone. Hence, there is currently no way to make intelligent decisions about what content should be preemptively sent to a particular user and automatically cached on the user's device.

SUMMARY OF THE INVENTION

In a first aspect, there is a method of providing content to a mobile web browsing device from a web server, illustrated in FIG. 1, comprising the steps of:
(a) receiving at a computer, remotely connected to the device over a wireless network, a log of data identifying content that has been viewed by the device;
(b) automatically sending updated content stored on the web server to the device over the wireless network;
(c) causing that updated content to be automatically stored in device memory.

Any kind of content can be identified and automatically sent to and stored at the device in this way without explicit user request; although the term 'web' is used in this specification, this term is not limited to HTML type content, but also includes all other forms of mark-up language, such as WML, XML etc., as well as content of any other kind. For example, it can include news (e.g. RSS feeds), weather, fan sites and other general content types. The only requirement is that the content can be downloaded to a device from a content server of some description, can be updated at its source or at the remote server, and can be stored in local device memory. Hence, the terms web browsing, web server, and web page should be expansively construed to cover any kind of content acquisition, content server, and content.

FIG. 2 illustrates a system in accordance with the claimed invention. The device (206, 208) may be a mobile telephone, smart phone, communicator, laptop computer, PDA, dedicated web terminal or similar. These devices will typically operate over wide area wireless networks such as GSM, UMTS, CDMA etc. cellular networks (202). The device may optionally also (or alternatively) connect to the origin web server (204) using (at least in part) a local area wireless network, such as 902.11 or Bluetooth wireless networks. In one implementation, the log is generated at the device and replicated to the remote computer (210).

In one implementation, the log is generated at the device and replicated to the remote computer.

The remote computer can either view the content from the web server and determine if and when the content has changed or else be notified by the web server if the content on the server has changed. When there is some updated content, the remote computer directly sends that updated content to the device or causes the updated content to be sent to the device (e.g. sends an instruction to some other kind of server that can push the updated content to the device). This may not happen immediately updated content is detected: the remote computer makes a decision whether or not to send, or cause to be sent, the updated content, by taking into account one or more of the following:
(a) How fast the content on the web server is changing;
(b) How often the user views the content;
(c) What time of day it is;
(d) What day of the week it is;
(e) What an operator of the wireless network wants to promote.

The operator of the wireless network can set thresholds for all of the above conditions; these thresholds can also be controlled at the remote computer and so can be updated at any point by the operator if it wants to implement different caching strategies. But because user activity is replicated back from the device to the remote computer, the content cached on a given device can be completely optimised for that user of that device and no-one else. The remote computer can additionally decide to cache certain pages without any prior log at all (e.g. the operator home page); those initially cached pages will then be refined as the logs of actual browsing are generated.

DETAILED DESCRIPTION

The present invention is implemented as a two-way replication technology from Cognima Limited, London, United Kingdom. The identity of content from a remote server (e.g. a WAP or web server) that is being viewed by the user on a mobile telephone is logged locally on the phone and that information replicated back (subject to user approval) to a remote computer (the 'Cognima Server') over a wireless network. With this information, and knowledge of how fast a given WAP/web site is changing, the Cognima Server can make intelligent decisions about whether it is worth preemptively caching particular content on a given user's phone—i.e. automatically sending updated versions of that content for automatic storage in device memory (typically cache memory).

1. How it Works

Cognima's Dynamic Service Delivery ('DSD') will measure what content is viewed on the phone and will log the time the user viewed it Using Cognima's replication technology, this logging information will be replicated back to the Cognima Server. Further details of this replication technology can be seen in PCT/GB02/005308 and PCT/GB03/0055, the contents of which are incorporated by reference.

At the Cognima Server there are a set of WAP or Internet sites that the server has been instructed to look at. The server periodically reads these sites to see if the content on the site has changed, so the Server knows how fast and at what times the content on a given site changes. This could also be achieved by closer integration with a content site where a direct XML feed is sent to the Cognima Server, allowing the Cognima Server to be notified when a site changes.

Given these two measurements, when a site is updated the Cognima Server can calculate, on a per-user basis, if it is worth sending the data for the updated site to be pre-emptively cached on the phone. The following conditions would be taken into account for this calculation:

- How fast the site is changing—if the site changes much faster than users will typically access it, pre-emptive caching might make no sense (e.g. ball-by-ball cricket updates)
- How often the user views a given site—if they never look at it then the site is not worth caching
- What time of day it is—if we are in an off-peak GPRS time it may be less costly to transfer pages from the site to the phone
- What day of the week it is—by measuring user activity over weeks or months, usage patterns can be deduced such that maybe a user is only likely to view a certain site on a weekend
- What the Operator wants to promote—they may have a certain site or sites they want to cache to make them more likely to be viewed

Figure 1:
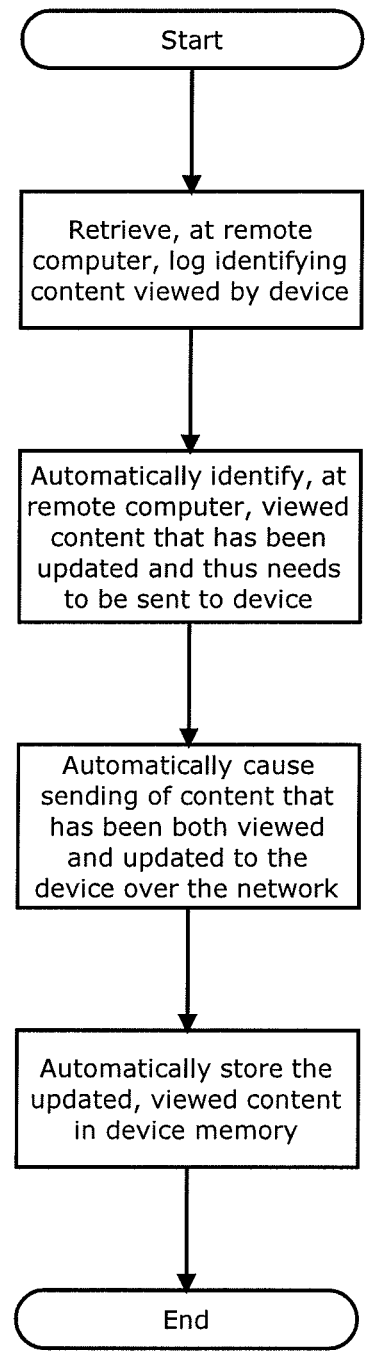
FIG. 1 is a flowchart illustrating steps according to the claimed invention.
Figure 2:
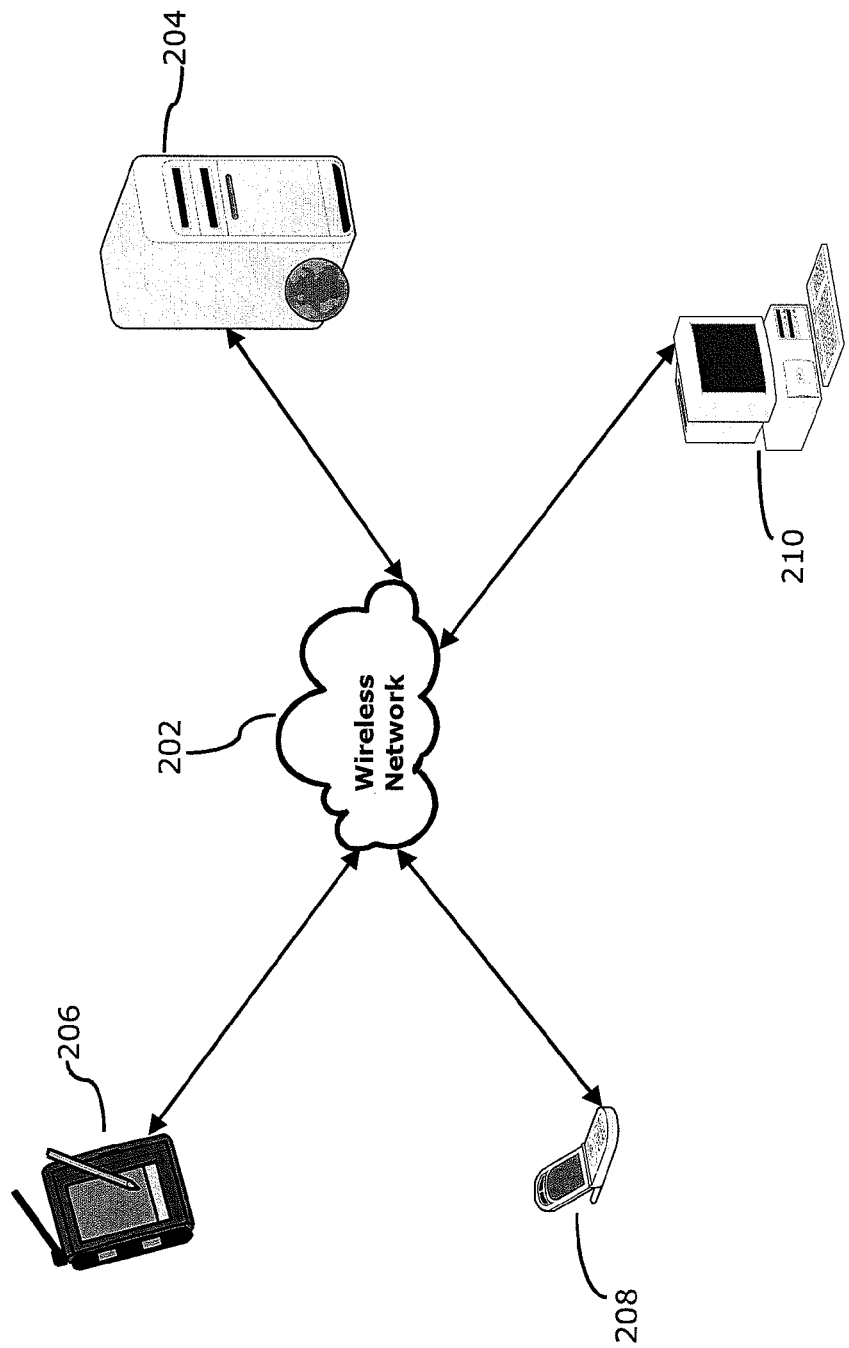
FIG. 2 is a block diagram illustrating a system according to the claimed invention.

For all sites, or on a site-by-site basis, the Operator can set thresholds for all of the above conditions—and if all these thresholds are met the site is then preemptively cached on the phone. These thresholds are controlled at the server and so can be updated at any point by the Operator if they want to implement different caching strategies.

The key point is that without the user activity logging that is replicated back from the phone none of these calculations can be sensibly made on a per-user basis. With this system the content cached on a given phone is completely optimised for that user and no-one else.

2. User Hints

Once the site has been cached on the phone it is possible to set up an API which allows the User Interface (UI) that displays the set of content links to be informed that a certain bit of content is or is not cached on the phone. The UI can then be changed in some way to show that a given site is cached and therefore that the user will get an "instant" viewing experience if they click on that link.

Another way this system could be implemented with no UI changes of the phone is to set up a set of locally cached menu of services which refer to locally cached pages on the phone—these would either contain the cache content or redirect the users to the external site if the site was not cached.

This allows content to be put pre-emptively on a phone on the basis that because it is instantly available a user will be more likely to click on it. Cognima allows such a hypothesis to be tested using the stats function described below.

3. Measuring How the System Works

Cognima logs information about what sites are being viewed on the device and can replicate that information to the Cognima Server. One extra bit of information that can be included is whether the site that the user views was cached on the phone or not. This data can be used to produce some very interesting statistics for Cognima's customers:

- The number of cached sites that were viewed. This translates directly to how much the user experience for the user was improved. Knowing the average download time of a site could also translate directly into the number of minutes of waiting time the user has been saved.
- Knowing the cached sites that have been viewed, it is possible to work out how much bandwidth (and this could be split into peak and off-peak bandwidth) has been saved by the Operator—i.e. when the user views a cached site the download of that data has been saved. As Cognima pre-emptively cached the site on the phone in the first place, it knows exactly how much data the transfer of the site would have taken.

Depending on the caching strategy chosen by the Operator, the overall bandwidth usage may actually increase, because some pages may be downloaded to users who never look at them. However the DSD system will move the majority of this data traffic from peak to off-peak periods, filling bandwidth troughs and reducing peaks, and so the marginal cost of transferring this data is close to zero. Peak bandwidth is saved because users no longer need to download WAP pages in real-time during peak hours; the pages will have been cached in advance on their phones during the preceding off-peak period.

These figures are more than just interesting information for Network Operators. New caching strategies can be tried out and the effect on both the customer experience and the bandwidth used can be measured.

4. Cache Expiration

Because the Cognima server knows how often a site is updated (and this may change depending on the time of day or day of the week) it can make a calculation of how long the cached data on the phone should stay cached before the data is removed and the phone goes back to using normal WAP or Website download.

For example if a site changes only once a day at 4 pm generally then when the content is cached on the phone this system will assign an expiration time of 4 pm the following day for that site. The Cognima server can determine how often a site is updated by starting with a default sampling rate (perhaps twice a day) and if the data has not changed in that time, the sampling rate could be doubled and if it has, the sampling rate could be halved.

It is also possible for the Cognima Server to examine a site and see that a site has not been updated and so it can extend the cache expiry time for the cached content on a phone by replicating just that information to the phone. In this case the content is already on the phone and so there is no need to download it to the phone again and so more bandwidth has been saved.

5. User Scenario

A typical user scenario for DSD is outlined below

The Operator wishes to promote a new teen WAP site that updates daily

Cognima DSD caches all or part of the WAP site in advance on phones belonging to subscribers within the target market segment A menu update is sent to these subscribers' phones, creating a WAP link in the top-level phone menu When a subscriber clicks on the new link in the phone menu, the phone's WAP browser is launched and instantly displays pages from the local cached copy of the WAP site If the subscriber follows a link to a page that has not been cached, the browser connects via WAP to the Internet and downloads the page to the phone as for any normal WAP page WAP site updates are cached nightly on subscribers' phones (if a subscriber's phone is switched off throughout the update period, then the cache will expire); each morning, subscribers will get instant access on their phones to the latest version of the WAP site Whenever subscribers access cached WAP pages on the phone, Cognima records their actions in usage logs that are replicated back to the server on a daily basis using off-peak bandwidth After a few days, the Cognima Server stops caching WAP pages for those subscribers that have shown little interest in accessing the site; the precise rules for this can be defined by the Operator After a few weeks, the Operator ends its promotion of the WAP site and removes the link from the main menu on subscribers' phones However, the Operator continues to cache the site for heavy users, and may even deliver them a custom menu so that the WAP link remains available.

6. Caching Strategies

With this system a number of caching strategies are possible ranging from simple models to ones involving prediction of exactly when a site might change and calculation of the cost/benefit of caching the site. A few of the simpler examples are shown below. Because this system would potentially modify user behavior the only way to be certain which one would be the best would be to test it on real users.

6.1 Simple Daily Update

In this model the idea is that a set of cached sites are updated overnight using off-peak bandwidth. The decision about what to cache is made on the basis that a site is only worth caching if:

1. The user accesses the site quite frequently
AND
2. The site does not change too often On the server the operator sets two thresholds:

Ta=minimum number of times a user needs to access a given site per week

Tc=maximum number of times a given site can change per week so if the user has the following usage:

a=no of times user access a given site per week
c=no of times given site changes per week then the site would only be cached if:

$(a > Ta)$ AND $(c < Tc)$

6.2 Fixed Cached Allocation

In this strategy some cached sites are updated overnight, some every few days overnight, but even fast changing sites are cached on the phone. The hypothesis here is that even though the site changes every hour or so (e.g. a new headline appears) the user is still interested in browsing news-headlines that are up to a day old. For slower changing content like features and reviews, then users could be interested in things that are up to a week old. So for example the news headlines are cached over-night, and an on-line magazine is updated overnight every few days. Crucially the preemptively cached content is the teaser (or advert) which drives people to connect in order to get the full story.

One way to do this would be to decide what volume of data you want to put on the phone and cache a standard selection of content. Once the data is cached, if the user hasn't looked at it for more than a week or two, it is removed. This frees up a slot for some new content. Since the Cognima Server keeps track of what a user looks at, it can tag content and offer new content that the user may be interested in based on what they look at most often. In this way the selection of cached content starts off generic and gradually evolves towards their personal set of interests.

The invention claimed is:

1. A method of providing content to a mobile web browsing device from any of several different web servers, comprising the steps of:
    (a) receiving at a remote computer, connected to both the device and each of those web servers over a network, a log of data identifying content that has been viewed by that specific device, the log being generated and sent by the device;
    (b) the remote computer identifying automatically without explicit user request any of that viewed content that has been updated and is therefore to be sent to the device;
    (c) the remote computer automatically causing only that viewed and updated content stored on any of the web servers to be sent to the device over the network;
    (d) causing that viewed and updated content to be automatically stored in device memory.

2. The method of claim 1 in which the log is generated at the device and replicated at the remote computer.

3. The method of claim 1 in which the remote computer views multiple content from the web server and determines if the content has changed.

4. The method of claim 1 in which the remote computer views multiple content from the web server and determines when the content has changed.

5. The method of claim 1 in which the remote computer is notified by the web server if the content on the server has changed.

6. The method of claim 1 in which the remote computer directly sends updated content to the device or causes the updated content to be sent to the device.

7. The method of claim 6 in which the remote computer is connected to both the device and each of the web servers over a wireless network, and wherein the remote computer makes a decision whether or not to send, or cause to be sent, the updated content, by taking into account one or more of the following:
    (a) How fast the content on the web server is changing;
    (b) How often the user views the content;
    (c) What time of day it is;
    (d) What day of the week it is;
    (e) What an operator of the wireless network wants to promote.

8. The method of claim 7 in which the operator of the wireless network can set thresholds for all of the above conditions.

9. The method of claim 7 in which these thresholds are controlled at the remote computer and so can be updated at any point by the operator if it wants to implement different caching strategies.

10. The method of claim 1 in which the remote computer sends data to the device that automatically causes the device to display a link to new content, the new content being automatically stored on the device.

11. The method of claim 1 in which the device includes a user interface that indicates whether given content is already stored in device memory or not.

12. The method of claim 1 in which the log also records the time that a specific item of content was viewed by the device.

13. The method of claim 1 in which the log identifies whether content that is being viewed is updated content that had earlier been stored in device memory.

14. The method of claim 1 in which the updated content is sent at off-peak periods or to otherwise fill bandwidth troughs.

15. A mobile web browsing device able to download and store content from a web server over a wireless network, wherein the device is programmed to:
(a) create a log of data identifying the content that is being viewed by the device;
(b) send that log to a remote computer automatically without any explicit request to watch for updates of specifically identified content, the remote computer being connected to the web server and the device over the wireless network;
(c) receive from the web server any content that has been identified by the remote computer as having been updated;
(d) automatically store only that viewed and updated content in memory.

* * * * *